UNITED STATES PATENT OFFICE.

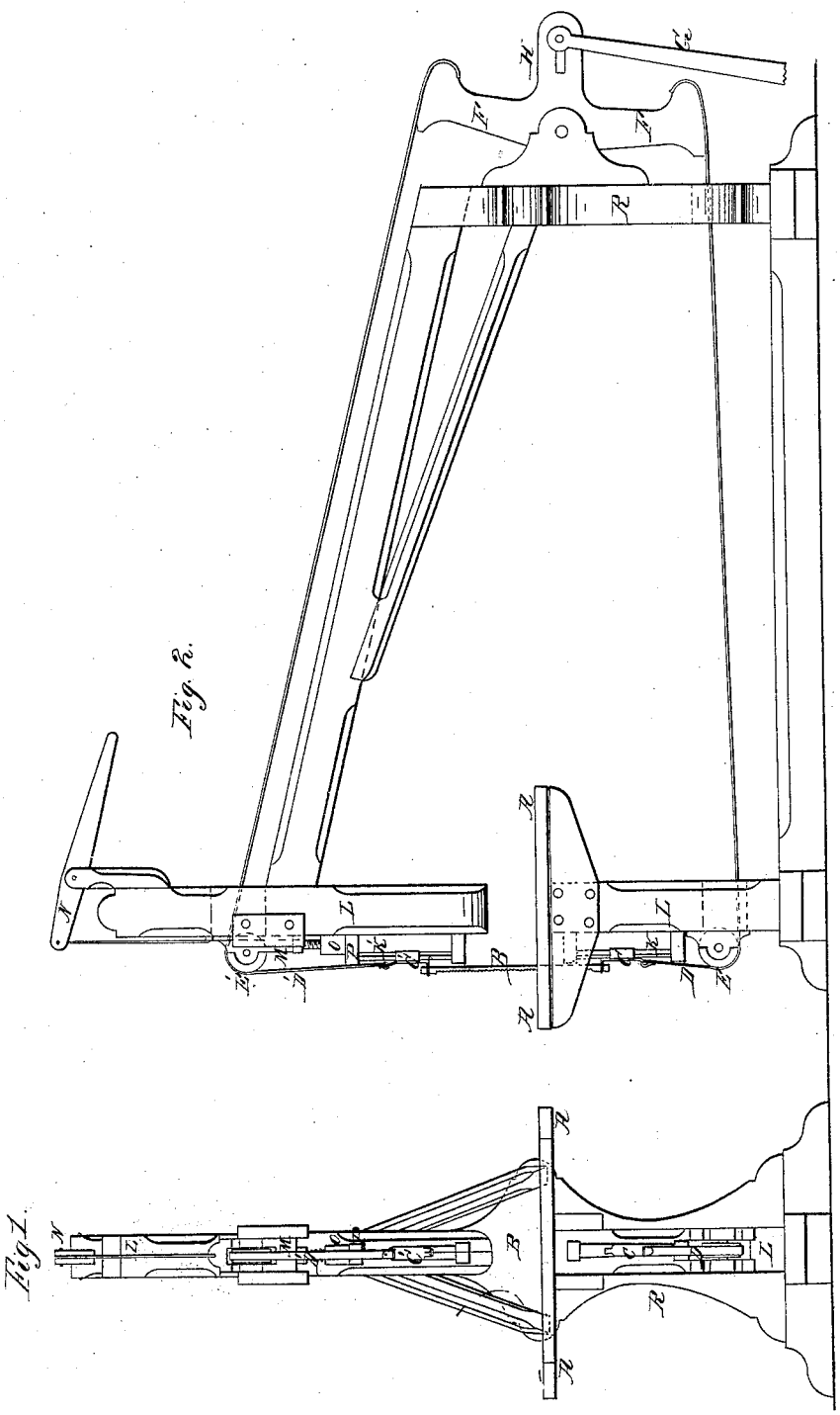

JOHN L. LAWTON, OF BALTIMORE, MARYLAND.

METHOD OF OPERATING SCROLL-SAWS.

Specification of Letters Patent No. 18,547, dated November 3, 1857.

*To all whom it may concern:*

Be it known that I, JOHN L. LAWTON, of the city of Baltimore and State of Maryland, have invented a new and useful Improvement in the Construction and Mode of Operating Scroll-Saws; and I do hereby declare that the following is a full and exact description thereof, reference being had to the accompanying drawings and to the letters of reference marked thereon.

The nature of my invention consists in straining the saw by means of two belts, one of which connects the upper end of the saw and the other the lower end of the saw to the opposite extremities of a distant double lever by the alternate movements of which the saw is operated: by which mode of construction ample space is provided around the saw for the shaping and handling of all descriptions of work.

To enable others skilled in the art to make and use my invention I will proceed to describe its construction and operation.

In the accompanying drawings, Figure 1 is a front elevation of the machine and Fig. 2 a side elevation, and where the same parts appear in both drawings they are indicated by the same letters.

In Figs. 1 and 2 A A is the table or platform upon which the work or stuff to be shaped or sawn is placed and B is the saw blade, which for the purposes of scroll work is usually made very narrow so as to turn the quick curves and corners of such work, and is attached to the buckles C, C' by means of catch pins or pinch screws, in the usual manner. To the buckles C and C' are also attached the belts D D and D' D', which belts pass around the pulleys E and E', back to the double armed lever F F. The lever F F being operated by the pitman G, which is attached by a pin or joint to the arm H, and by drawing alternately the upper and lower belts D D and D' D' operates the saw B. To keep the saw B in proper position I cause the buckles C and C' to slide upon the square guide posts L L, (a portion of which is removed above the table in order to give free space at the saw for the shifting of the material while being cut). For the purpose of straining the saw I attach the upper pulley B' to the slider M and raise and lower it, so as to tighten or slacken the belts, by the lever N, and when the pulley is sufficiently elevated to give the necessary tension to the saw blade I place the adjustable screw block O between the slider M and the stud or bracket P, and by this means any degree of tension that may be required can be given to the saw.

When the saw is not in operation the screw block O should be removed so as to slack up the saw blade and the belts.

The advantages of this mode of construction and operation are important. 1st, the machine is completely free from obstruction for all ordinary purposes, as the distance from the saw B to the back post R is only limited by convenience. 2nd the absence of a saw gate and all the moving parts being very light permits of the saw being operated at a very rapid speed, when compared with the ordinary gate machines, and the moving parts being light, the expenditure of power in overcoming the inertia of the machine is but small, which is an economical result.

Having thus explained the nature, construction and mode of operation of my improved sawing machine what I claim therein as my invention and desire to secure by Letters Patent is—

The method of operating the saw by means of the belts and back levers substantially as described.

JNO. L. LAWTON.

Witnesses:
JACOB B. THOMAS,
J. E. THOMAS.